United States Patent
Thakkar et al.

(10) Patent No.: US 10,949,893 B2
(45) Date of Patent: Mar. 16, 2021

(54) REAL-TIME BIDDING SYSTEM THAT ACHIEVES DESIRABLE COST PER ENGAGEMENT

(71) Applicant: Adobe Inc., San Jose, CA (US)

(72) Inventors: Kevin Thakkar, Sunnyvale, CA (US); John M. Trenkle, Albany, CA (US); John Hughes, Lafayette, CA (US); Adam Rose, San Pablo, CA (US); Jason Lopatecki, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/572,299

(22) Filed: Sep. 16, 2019

(65) Prior Publication Data

US 2020/0013095 A1    Jan. 9, 2020

Related U.S. Application Data

(63) Continuation of application No. 14/565,197, filed on Dec. 9, 2014, now Pat. No. 10,453,100.
(Continued)

(51) Int. Cl.
*G06Q 30/02*    (2012.01)

(52) U.S. Cl.
CPC ..... *G06Q 30/0275* (2013.01); *G06Q 30/0242* (2013.01); *G06Q 30/0249* (2013.01)

(58) Field of Classification Search
CPC .......... G06Q 30/0275; G06Q 30/0242; G06Q 30/0249
(Continued)

(56) References Cited

U.S. PATENT DOCUMENTS

| 5,937,392 A | 8/1999 | Alberts |
| 6,338,043 B1 | 1/2002 | Miller |

(Continued)

FOREIGN PATENT DOCUMENTS

| CN | 103014530 A | * | 4/2013 |
| WO | WO 2011-056346 | | 5/2011 |
| WO | WO 2015-034838 | | 3/2015 |

OTHER PUBLICATIONS

Fiona Salmon, Eight ways to improve the real-time bidding ecosystem, 2015 (Year: 2015).*
(Continued)

*Primary Examiner* — Tarek Elchanti
(74) *Attorney, Agent, or Firm* — Keller Jolley Preece

(57) ABSTRACT

Systems and methods are disclosed for optimizing an online advertising campaign both before the campaign begins, and dynamically during the campaign. Optimizations are performed comparatively between a plurality of MPs (Media Properties) based on their relative cost-per-engagement. Comparisons are performed by first stack ranking MP inventory including any of sites, feeds, and verticals, based on cost per engagement. Once ranked, scores are assigned to the targeted inventory and a mean score is determined. Then, the inventory is rated as high, normal, or low impact based on their scores compared with the mean and a standard deviation for all scores. Higher impact sites with scores at least a standard deviation above the mean are initially favored, and the MP targeting strategy is dynamically adjusted during the campaign based on periodically re-evaluating the MP rankings, frequencies of engagement, and campaign progress relative to fulfillment in an allotted run time.

20 Claims, 4 Drawing Sheets

Related U.S. Application Data

(60) Provisional application No. 62/042,238, filed on Aug. 26, 2014.

(58) Field of Classification Search
USPC .......................................... 705/14.41, 14.71
See application file for complete search history.

(56) References Cited

U.S. PATENT DOCUMENTS

| | | | |
|---|---|---|---|
| 6,560,578 | B2 | 5/2003 | Eldering |
| 7,181,412 | B1 | 2/2007 | Fulgoni et al. |
| 7,260,837 | B2 | 8/2007 | Abraham et al. |
| 7,493,655 | B2 | 2/2009 | Brown |
| 7,835,937 | B1 | 11/2010 | Karlsson et al. |
| 7,835,938 | B1 | 11/2010 | Karlsson et al. |
| 7,930,285 | B2 | 4/2011 | Abraham et al. |
| 8,069,076 | B2 | 11/2011 | Oddo |
| 8,073,807 | B1 | 12/2011 | Srinivasaiah |
| 8,145,645 | B2 | 3/2012 | Delli Santi et al. |
| 8,175,914 | B1 | 5/2012 | Benson et al. |
| 8,182,346 | B2 | 5/2012 | Herrmann et al. |
| 8,190,475 | B1 | 5/2012 | Merrill |
| 8,341,047 | B1 | 12/2012 | Furney et al. |
| 8,380,562 | B2 | 2/2013 | Toebes et al. |
| 8,412,648 | B2 | 4/2013 | Karypis et al. |
| 8,554,602 | B1 | 10/2013 | Zohar et al. |
| 8,571,930 | B1 | 10/2013 | Galperin |
| 8,650,084 | B2 | 2/2014 | Athey et al. |
| 8,700,543 | B2 | 4/2014 | Glickman |
| 8,719,082 | B1 | 5/2014 | Snyder et al. |
| 8,751,461 | B2 | 6/2014 | Abraham et al. |
| 8,924,993 | B1 | 12/2014 | Niebles Duque et al. |
| 9,087,332 | B2 | 7/2015 | Bagherjeiran et al. |
| 9,135,655 | B2 | 9/2015 | Buchalter et al. |
| 9,715,699 | B1 | 7/2017 | Els et al. |
| 9,727,878 | B2 | 8/2017 | Curd et al. |
| 10,007,926 | B2 | 6/2018 | Hughes et al. |
| 10,049,382 | B2 | 8/2018 | Hughes et al. |
| 10,176,484 | B2 | 1/2019 | Dilling et al. |
| 2003/0074252 | A1 | 4/2003 | Chandler-Pepelnjak et al. |
| 2003/0105677 | A1 | 6/2003 | Skinner |
| 2004/0019518 | A1 | 1/2004 | Abraham et al. |
| 2005/0021395 | A1 | 1/2005 | Luu |
| 2006/0015294 | A1 | 1/2006 | Yetter, Jr. et al. |
| 2006/0018516 | A1 | 1/2006 | Masoud et al. |
| 2006/0074749 | A1 | 4/2006 | Kline et al. |
| 2006/0212350 | A1 | 9/2006 | Ellis et al. |
| 2006/0224496 | A1 | 10/2006 | Sandholm et al. |
| 2007/0027760 | A1 | 2/2007 | Collins |
| 2007/0067215 | A1 | 3/2007 | Agarwal et al. |
| 2007/0094042 | A1 | 4/2007 | Ramer et al. |
| 2007/0180469 | A1 | 8/2007 | Finley et al. |
| 2007/0208728 | A1 | 9/2007 | Zhang et al. |
| 2009/0006145 | A1 | 1/2009 | Duggal |
| 2009/0024546 | A1 | 1/2009 | Ficcaglia et al. |
| 2009/0119172 | A1 | 5/2009 | Soloff |
| 2009/0150238 | A1 | 6/2009 | Marsh et al. |
| 2009/0216619 | A1 | 8/2009 | Tavernier |
| 2009/0254420 | A1 | 10/2009 | Curd et al. |
| 2010/0138290 | A1 | 6/2010 | Zschocke et al. |
| 2010/0262455 | A1 | 10/2010 | Karlsson et al. |
| 2010/0262464 | A1 | 10/2010 | Monteforte et al. |
| 2010/0262497 | A1 | 10/2010 | Karlsson |
| 2011/0035276 | A1 | 2/2011 | Ghosh et al. |
| 2011/0106633 | A1 | 5/2011 | Cook |
| 2011/0137721 | A1 | 6/2011 | Bansal |
| 2011/0145070 | A1 | 6/2011 | Wolinsky et al. |
| 2011/0213654 | A1 | 9/2011 | Yang |
| 2011/0231242 | A1 | 9/2011 | Dilling et al. |
| 2011/0246310 | A1 | 10/2011 | Buchalter et al. |
| 2012/0004983 | A1 | 1/2012 | Borthwick et al. |
| 2012/0041816 | A1 | 2/2012 | Buchalter |
| 2012/0054021 | A1 | 3/2012 | Kitts et al. |
| 2012/0158456 | A1 | 6/2012 | Wang et al. |
| 2012/0158954 | A1 | 6/2012 | Heffernan et al. |
| 2012/0197816 | A1 | 8/2012 | Short et al. |
| 2012/0203623 | A1 | 8/2012 | Sethi et al. |
| 2012/0239809 | A1 | 9/2012 | Mazumdar et al. |
| 2012/0316957 | A1 | 12/2012 | Zhou et al. |
| 2012/0323674 | A1 | 12/2012 | Simmons et al. |
| 2013/0103681 | A1 | 4/2013 | Renders et al. |
| 2013/0124308 | A1 | 5/2013 | Hegeman et al. |
| 2014/0236710 | A1 | 8/2014 | Nashed |
| 2014/0278749 | A1 | 9/2014 | Trenkle et al. |
| 2014/0278912 | A1 | 9/2014 | Hughes et al. |
| 2014/0289017 | A1 | 9/2014 | Trenkle et al. |
| 2014/0330646 | A1 | 11/2014 | Mierle et al. |
| 2014/0337143 | A1 | 11/2014 | Petersen et al. |
| 2015/0066639 | A1 | 3/2015 | Knapp et al. |
| 2015/0066662 | A1 | 3/2015 | Knapp et al. |
| 2015/0095166 | A1* | 4/2015 | Sweeney ............ G06Q 30/0277 705/14.71 |
| 2015/0106190 | A1 | 4/2015 | Wang et al. |
| 2015/0186927 | A1 | 7/2015 | Chittilappilly et al. |
| 2016/0063573 | A1 | 3/2016 | Thakkar et al. |

OTHER PUBLICATIONS

Nielsen Holdings N.V., "AOL Leverages Nielsen Online Campaign Ratings Measurement to Offer TV-Like GRP Guarantee for Online Video", www.nielsen.com/us/en/insights/press-room/2012/aol-leverages-nielsen-onlinecampaiqn-ratinqs-measurement-to-off. html, (Apr. 16, 2012), 3 pp. total.

Nielsen Holdings N.V., "Nielsen Campaign Ratings Overview", www.nielsen.com/us/en/practices/marketing-effectiveness/nielsen-campaignratings/overview.html, (2013), 4 pp. total.

Yume, "Calculating Online Video GRP for Television Buyers", downloaded from www.YuMe.com, (at least as early as 2010), pp. 1-5.

Baum, Eric, "What is Thought", The MIT Press, (2004), pp. 33-65.

Microsoft Press, "Microsoft Computer Dictionary", Fifth Edition, (2002), p. 23.

Searle, John R., "Mind—A Brief Introduction", Oxford University Press, (2004), pp. 62-67.

Robotics, Science and Systems III, Wolfram Burgard, Oliver Brock, and Cyrill Stachniss, The MIT Press, 2008, pp. 41-48.

Language and Mind, Chomsky, Oxford University Press, 2005, p. 62.

Computing the Mind, Shimon Edelman, Oxford University Press, 2008, pp. 26-31.

Noetics, Lawrence Krader, 2010, Peter Lang Publishing, pp. 551-553.

Britannica Concise Encyclopedia, Encyclopedia Britannica, 2006, p. 537.

"Advances in Expert Systems", Published by InTech; Edited by Petrcia Vizureanu, (Dec. 5, 2012), pp. 101-103.

Frame Analysis, Goffman, Northeastern University Press, 1974, pp. 1-39, 301-344.

Computing the Mind, Oxford University Press, Edelman, 2008, pp. xi-36.

Metaphors We Live by, Lakoff, University of Chicago Press, 1980, pp. ix-55.

The Daily You, Yale University Press, Turow, 2011, pp. 1-170 [emphasis pp. 79-85].

The Presentation of Self in Everyday Life, Anchor Books, Goffman, 1959, pp. 17-76.

YouTube and Video Marketing, John Wiley and Sons, Jarboe, 2012, pp. xv-18, 96, 338-348, 416.

Undoing Gender, Routledge, Butler, 2004, pp. 52-101.

U.S. Appl. No. 14/565,197, Apr. 10, 2018, Office Action.

U.S. Appl. No. 14/565,197, Dec. 20, 2018, Office Action.

U.S. Appl. No. 14/565,197, May 29, 2018, Notice of Allowance.

U.S. Appl. No. 13/927,687, Apr. 6, 2015, Office Action.

U.S. Appl. No. 13/927,687, Oct. 30, 2015, Office Action.

U.S. Appl. No. 13/927,687, Oct. 21, 2016, Office Action.

U.S. Appl. No. 13/927,687, Jul. 13, 2017, Office Action.

U.S. Appl. No. 14/143,984, Dec. 11, 2015, Office Action.

U.S. Appl. No. 14/143,984, Jul. 27, 2016, Office Action.

(56) References Cited

OTHER PUBLICATIONS

U.S. Appl. No. 14/143,984, Nov. 29, 2017, Office Action.
U.S. Appl. No. 14/143,984, Apr. 23, 2018, Notice of Allowance.
U.S. Appl. No. 14/144,016, Dec. 3, 2015, Office Action.
U.S. Appl. No. 14/144,016, Jul. 27, 2016, Office Action.
U.S. Appl. No. 14/144,016, Dec. 6, 2017, Office Action.
U.S. Appl. No. 14/144,016, Apr. 20, 2018, Notice of Allowance.
U.S. Appl. No. 14/167,183, Dec. 22, 2016, Office Action.
U.S. Appl. No. 14/167,183, Jun. 29, 2017, Office Action.
U.S. Appl. No. 14/167,183, Nov. 29, 2018, Office Action.
U.S. Appl. No. 14/167,183, Jun. 25, 2019, Office Action.
U.S. Appl. No. 14/295,811, Nov. 13, 2018, Office Action.
U.S. Appl. No. 14/295,811, May 31, 2019, Office Action.
U.S. Appl. No. 15/052,718, Nov. 19, 2018, Office Action.
U.S. Appl. No. 15/052,718, May 31, 2019, Office Action.
U.S. Appl. No. 14/565,197, May 29, 2019, Notice of Allowance.
U.S. Appl. No. 14/295,811, Feb. 20, 2020, Office Action.
U.S. Appl. No. 15/052,718, Apr. 6, 2020, Office Action.
U.S. Appl. No. 14/295,811, Jun. 26, 2020, Office Action.
U.S. Appl. No. 15/052,718, dated Oct. 14, 2020, Notice of Allowance.

\* cited by examiner

REAL-TIME BIDDING SYSTEM THAT ACHIEVES DESIRABLE COST PER ENGAGEMENT

CROSS-REFERENCE TO RELATED APPLICATIONS

This application is a continuation of U.S. patent application Ser. No. 14/565,197, filed Dec. 9, 2014, which claims the benefit of U.S. Provisional Patent Application No. 62/042,238 filed Aug. 26, 2014. Each of the aforementioned applications are hereby incorporated by reference in their entirety

BACKGROUND OF THE INVENTION

1. Field of the Invention

The present invention relates generally to systems and methods for operating Real-Time Bidding platforms where Media Properties (MPs) are characterized and impact levels are determined for different MPs at least with respect to cost per engagement. The present invention also relates to systems and methods for determining impact levels for MPs both in advance of a campaign, as well as re-evaluating impact levels during a campaign to determine how frequently bids should be placed with respect to each MP and what prices should be bid.

2. Prior Art

Real Time Bidding

In an RTB (Real-Time Bidding) environment for electronic media impression auctions, an electronic advertising agency/consolidator operating a demand-side platform receives billions of daily auction opportunities for electronic media impressions from partners like Google®, Yahoo®, etc. These partners operate auctions for ad impressions on various Media Properties or MPs each of which represents a specific instance of a media platform for electronically delivering information to a viewer. An MP as referenced herein usually refers to a website or URL page on the Internet, however may also refer for example and without limitation to verticals, feeds, electronic billboards, television, an App ID, a Game ID, and other electronic media and media channels where electronic advertisements can be placed. An MP representing vertical segments or media feeds enables electronic ads to be placed on any variety or combination of media formats.

When a Demand Side Platform wins an auction for an ad impression opportunity, the partner places the electronic ad based on auction results. A partner's auction is considered an external auction with respect to a demand-side platform, where an internal auction may also be operated to determine which advertisements, also referred to herein as ads, and bids are submitted to the external auction. Each ad impression opportunity includes information parameters about the ad impression—for example, the target website/MP, geolocation of the user, ad size, user cookie, etc, that are used for targeting purposes. The demand side platform then processes hundreds of ads in their system, supplied by advertiser clients along with desired filtering/targeting parameters, against information parameters supplied by the partner, and filters out any ads that do not qualify (for example the ad does not want to target youtube.com®). For ads that are not removed due to a mismatch with targeting parameters, the demand-side platform then evaluates the corresponding bids that represent how much each client advertiser is willing to pay. The winning bid in the internal auction is then sent to the external auction with the partner to compete for the impression opportunity.

Note that in some scenarios, the electronic advertising agency/consolidator operating a demand-side platform and the advertiser/client may in fact be the same entity—for instance when they comprise a large organization with an internal advertising department capable of acting as a demand-side platform. Also, in such an instance, there may be no internal auction —just a submission to an external auction.

Determining which MPs to bid for, how frequently to bid, and what prices to bid can be challenging in order to achieve the best results for the advertiser/client. One measure of the effectiveness of an electronic advertising campaign is the cost per engagement, and it is useful to develop and deploy strategies for optimizing cost per engagement while achieving successful campaign results in a prescribed campaign run time. MP targeting strategies are needed before a campaign is started, and further, methods are needed for automatically reevaluating and optimizing MP targeting strategies during the execution of an online advertising campaign (the campaign runtime).

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

Figure 1:
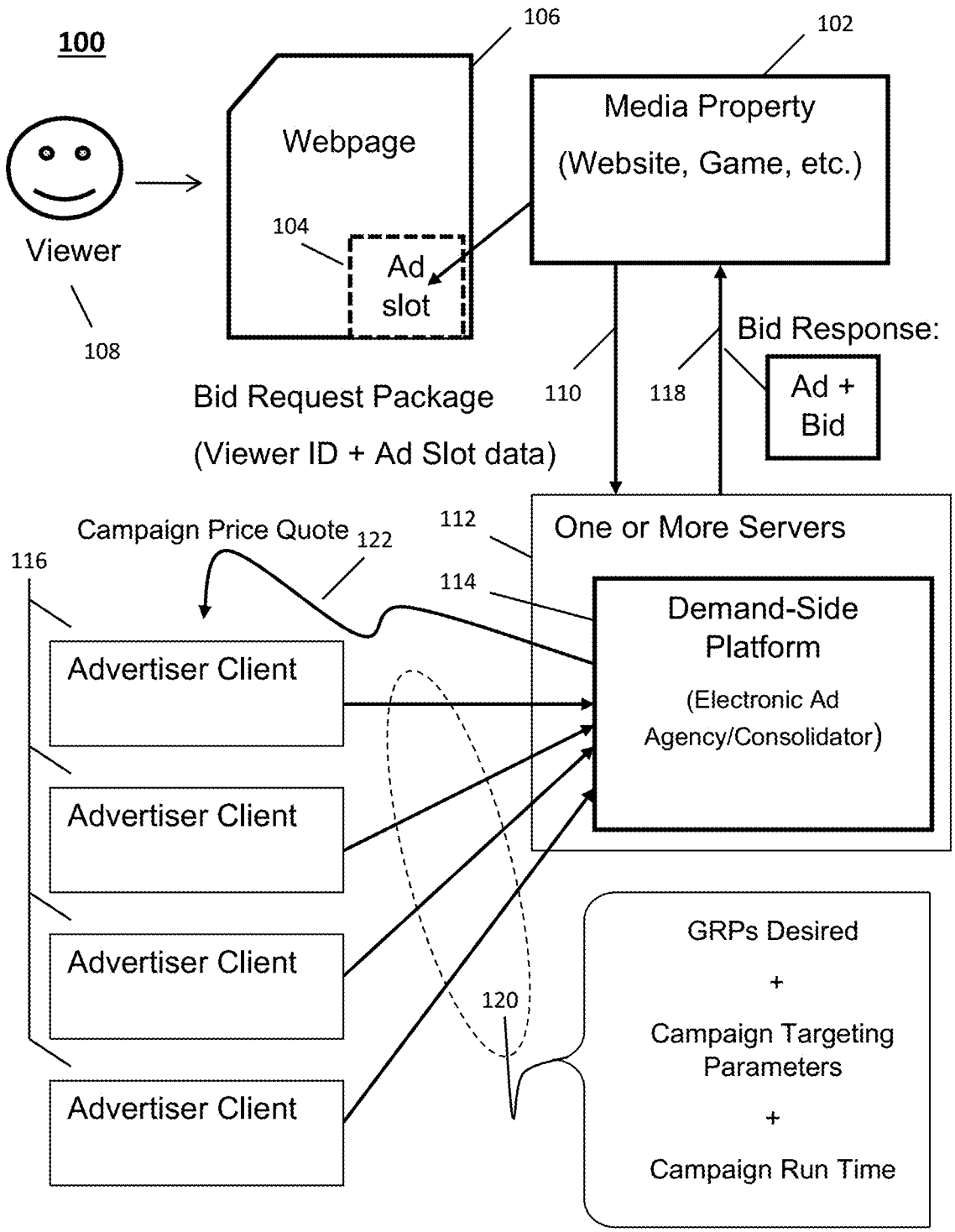
FIG. 1 shows an overview block diagram showing system components and data flow for a demand side platform according to the invention.

Systems and methods are disclosed for optimizing an online advertising campaign both before the campaign begins, and dynamically during the campaign. Optimizations are performed comparatively between a plurality of MPs (Media Properties) based on their relative cost-per-engagement. Comparisons are performed by first stack ranking MP inventory including any of sites, feeds, and verticals, based on cost per engagement. Once ranked, scores are assigned to the targeted inventory and a mean score is determined. Then, the inventory is rated as high, normal, or low impact based on their scores compared with the mean and a standard deviation for all scores. Higher impact MPs with scores at least a standard deviation above the mean are initially favored, and the MP targeting strategy is dynamically adjusted during the campaign based on periodically re-evaluating the MP rankings, frequencies of engagement (engagement rates), and campaign progress (pace) relative to fulfillment of campaign goals (including spending the campaign budget) in an allotted run time. An MP's Impact Level is determined according to the MP's score indicating how effective the MP is with respect to cost of engagement, and based on how the MP's score compares with scores of other MPs. An MP with a comparatively high score will have a relatively high impact level and a comparatively low cost of engagement, and is therefore preferred when bidding for impression opportunities during an advertising campaign.

In general, an impression occurs when a viewer is shown—or has an opportunity to be shown—a creative (image, video, etc.—typically an advertisement). An impression may be fully viewable, partially viewable, or not viewable, but if the creative is shown somewhere on for instance a webpage, it may still be counted as an impression regardless. Many webpages are much longer in the vertical direction than the vertical space on the viewer's screen and therefore a creative may appear well below the "fold" as represented by the bottom of the currently viewable portion of the webpage.

An engagement with an MP is an event where a viewer interacts—or has an opportunity to interact—with the advertisement, or as a result of viewing the advertisement the viewer performs some other action(s).

An engagement may involve and/or be related to one or more of the following non-limiting list of engagement types and engagement-related parameters:

cost of viewing a creative—where a creative (image, video, etc.—typically an advertisement) is shown to a viewer as either a pre-roll advertisement or where the viewer elects to view the creative, this is the cost of the impression for viewing the creative.

viewing rate—this is a frequency value for how frequently a creative/advertisement is viewed by a viewer on an MP. For Pre-roll, this rate is 100%, but for display it could be less than 100%.

engagement rate—this is a frequency value for how frequently an engagement event occurs on an MP.

cost for completing viewing a creative (typically for videos)—this is where information is available for how much of a video is actually shown to a viewer, this parameter represents the cost of impressions where the viewer actually allowed the video to complete.

completion rate—this is where viewers allow a video to complete, and this parameter represents how frequently these completions occur.

clicks percentage—over all impressions shown up to any point in a campaign, this represents the percentage of impressions where a viewer clicked on the creative.

cost per click—over all impressions shown up to any point in a campaign, this represents the average cost for viewers clicking on the creative.

viewability percentage—over all impressions shown up to any point in a campaign, or recorded historically for an MP. This represents what percentage of impressions are viewable.

cost per viewable impression—This is the cost of providing viewable impressions as defined above for viewability percentage.

average player size—where the player size (typically described in terms of Width×Height) is known for impressions (PCs have larger player size, smartphones have smaller player size), this is the average player size.

diversity of the MP—MP diversity is the proportion of MPs that have received impressions on a campaign. For example, if 50% diversity is desired, no site (i.e. youtube.com) should receive more than 50% of the impressions on a campaign. This is to ensure an advertisement is being adequately diversified among different MPs.

private inventory vs. public inventory—Private inventory is also known as guaranteed inventory. In this context, it's a deal a client/advertiser makes (via a demand-side platform) with a publisher/partner that ensures certain impressions are delivered for the advertiser, and not available on the general market. In the context of optimization, this allows a client/advertiser to ensure they are buying their private inventory before buying any inventory on the public market.

Viewability

Most typically an impression is where the advertisement is placed on a currently active webpage. Impressions may be visible, partially visible, or not visible, depending on the position of the advertisement on the page, and to what extent the viewer has scrolled the page, or for small screen mobile display devices, to what extent they have zoomed the page. As described herein it is possible to determine the position of the advertisement on the page and determine the extent of its viewability. This determination can then be incorporated into a bidding strategy, including a cost of engagement where the engagement comprises a viewable impression, or where the cost of engagement for an MP represents the average viewability of impressions on that MP.

For the parameter of "viewability percentage", one non-limiting form would be that over all impressions shown up to any point in a campaign, the viewability percentage would represent what percentage of impressions were viewable. One way to judge this is according to the MRC (Media Rating Council) standard wherein at least 50% of the ad is viewable on screen in an active window/tab for at least 1 second. Other judgments regarding viewability are possible. For instance, the specific percentage of an ad that is viewable can be determined, for example, by methods described with respect to the standards and open source software supplied by openvv.org. Using such methods, a viewability determination can be made based on the exact percentage of an advertisement that is displayed "above the fold", in other words in the viewable space shown to a viewer, typically on a webpage.

Data on viewability percentage can be accumulated historically for each MP with respect to cost of engagement information, and then used in formulating a bidding strategy for a future campaign. Data on viewability percentage can also be acquired and analyzed dynamically during a campaign, and if the viewability percentage for a specific MP changes noticeably during a campaign thereby affecting the MP's overall cost of engagement effectiveness, then the bidding strategy can be altered to shift spending towards other MPs with more attractive cost of engagement with respect to viewability. As described above, a simple determination can be made to categorize an impression as viewable based on a specific percentage threshold, i.e. 50%. Alternately, viewability can be judged in a fashion where a viewability percentage is used to calculate the cost of engagement with respect to viewability and where the viewability percentage is the actual viewability percentage number with no threshold determination being applied.

In addition to a viewability percentage as described above, a viewability parameter (average player size—listed above) can also include the effect of player size, in other words the size of a creative shown to a viewer on an MP. Essentially, the larger the size of the displayed creative the more effective the engagement may be, and therefore the cost per engagement parameter for that MP can be adjusted according to the measured size of the player that displays the creative.

Budget Shifting Across Diverse Display Format Types

In addition to adjusting how a campaign budget is allocated among a plurality of MPs in response to changes in cost of engagement, a campaign may also have its budget apportioned differently with respect to display format types. For example a specific campaign may target MPs by way of multiple display format types including for example, and not limited to:

desktop/laptop/notebook;
tablet;
smartphone;
television; and
electronic billboards; etc.

The cost of engagement can then be tracked not only respect to MPs associated with each of these display format types, but also with respect to each display format type regardless of which MPs are reached on it. It may then be determined either in advance of the campaign or from time to time during a campaign that a particular display format type is exhibiting a changed cost of engagement with respect to its historical cost of engagement. As a result of this, an advertising campaign can be dynamically adjusted to shift the campaign budget away from that particular display format type or towards that display format type depending upon whether its cost of engagement has increased or decreased respectively.

In general a campaign budget may be shifted away from one or more display format types and towards one or more other display format types based on at least one or more parameters as described in the following exemplary and non-limiting list of parameters measured for one or more of the display format types:

Viewability percentage;
viewing rate;
cost of viewing a creative;
cost per viewable impression;
engagement rate;
cost of engagement;
a rate for viewers completing surveys;
a rate for viewers completing the viewing of a video;
cost per viewable impression where a video starts playing;
cost for completing viewing a creative;
average player size;
diversity of an MP
Impressions that are shared by a viewer on social media;
clicks percentage;
cost per click;
private inventory vs. public inventory;
cost per GRP point; and
$3^{rd}$ party verified performance.

Budget Allocation/Shifting and Precedence-Based Goal Setting

An allocation for a campaign budget among both MPs and display format types may be shifted during a campaign by a method where a sequence of goals is established for the campaign, and where actions are associated with each event where a goal is met. For example a first goal might be that an MP should reach a number of X engagements. When the first goal is met, then a corresponding action might be that a portion of the campaign budget is shifted away from the MP that has reached that goal, and that budget portion is then spent on other MPs and/or display format types. Subsequently a second goal may be established that only takes effect once the first goal has been met. The second goal might be that a specific display format type would reach a number of Y engagements. Then based on meeting the second goal, a corresponding action might be that a portion of the campaign budget is shifted away from the specific display format type that has reached that goal, and that budget portion is then spent on other MPs and/or display format types. Alternately, another exemplary and non-limiting scenario for budget shifting is where according to a first goal, a cost of engagement for a particular MP drops below a threshold during a campaign, whereupon a portion of the campaign budget would be shifted to other MPs. Subsequently, a second goal for the particular MP might be that should its cost of engagement rise above a threshold, then a portion of the budget would be shifted back towards the particular MP. An opposite scenario is also possible where according to a first goal, a cost of engagement for a particular MP rises above a threshold during a campaign, whereupon a portion of the campaign budget would be shifted to the particular MP from other MPs. Subsequently, a second goal for the particular MP might be that should its cost of engagement drop below a threshold, then a portion of the budget would be shifted away from the particular MP.

Viewers are commonly identified by their electronic "cookie" passed from their computer to a site they are visiting, and as such a process for classification of viewers according to various viewer characteristics is sometimes known as "cookie bucketing" or "viewer profiling". Note that a particular viewer may in fact use multiple computers and therefore have multiple cookies. While multiple cookies may typically be treated as multiple viewers, it is possible to treat them as the same viewer if sufficient information on a viewer and their computer use is known. For the sake of non-limiting examples presented herein, each cookie is assumed to represent a different viewer and the terms "viewer" and "cookie" are assumed to be synonymous.

FIG. 1 shows an overview block diagram describing system components and data flow for a demand side platform according to the invention with a focus on information conveyed relative to targeting MPs and viewers, and for estimating campaign results to an advertiser client 116 provided by a demand-side platform 114. Campaign results may be expressed for example in terms of GRPs or Gross Rating Points, as described in co-pending U.S. applications Ser. Nos. 14/143,984; 14/144,016; 14/167,183; and 14/295,811, the contents of which are hereby incorporated by reference.

Per FIG. 1, an ad slot opportunity 104 on a webpage 106 offered by an exemplary media property 102 is offered in an auction for an impression opportunity. Here, an advertisement is to be placed in ad slot 104 on webpage 106 to be viewed by a specific viewer 108. Media property 102 sends a bid request package 110 consisting of viewer identification information for viewer 108 and criteria specific to ad slot 104. This bid request package is received on one or more servers 112 where the demand-side platform 114 operates, and this information is processed thereon. Subsequently, if the impression opportunity fits the targeting criteria of one or more advertiser clients 116, the demand-side platform will respond with a bid response 118 which includes the advertisement itself as well as a bid price.

This particular impression opportunity may fit with a previously defined advertising campaign for one or more advertiser clients 116 and/or for a targeted MP which may include MP 102. MP 102 may have been determined by methods described herein to have a ranking with respect to cost per engagement that fits a criteria for choosing to bid for the ad opportunity. For such campaigns, the demand-side platform 114 may provide a price quote 122 to an advertiser/client. As opposed to simply quoting impressions to be purchased, according to the invention such a campaign may be quoted in terms of GRPs delivered, essentially guaranteeing viewing reach for specific targeting criteria. In order to receive such a campaign price quote 122 providing GRPs for the campaign, an advertiser client 116 would have previously delivered to the demand-side platform a request for a quotation including information package 120. Information package 120 includes for example and without limitation: GRPs desired; campaign targeting parameters; and campaign runtime. Estimations for campaign results in terms of GRPs can also be based at least in part on estimations of cost per engagement as described herein.

Figure 2:
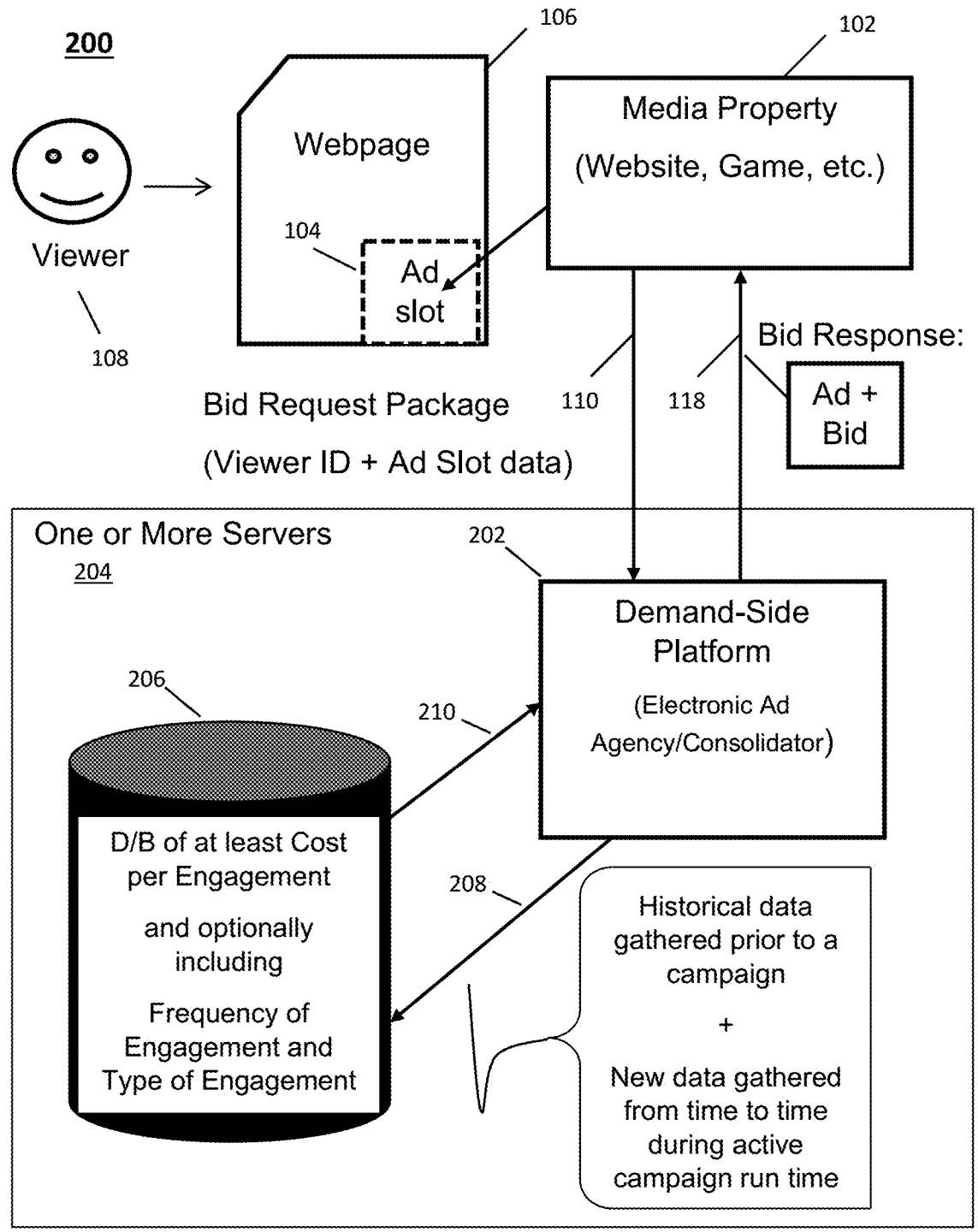
FIG. 2 shows an overview block diagram showing system components and data flow for acquiring historical data relative to at least cost per engagement and frequency of engagement.

FIG. 2 shows an overview block diagram describing system components and data flow for cost per engagement profiling. Here, a demand side platform 202 operating on one or more processors/servers 204 operates according to the exemplary flows described in at least FIGS. 3 and 4. First, a database 206 is created of at least cost per engagement and optionally including frequency of engagement and type of engagement, all based on historical data gathered prior to a campaign. This information is made available 210 to demand-side platform 202 for use in formulating a bidding strategy for targeting MPs in advance of commencing a campaign as shown for example per FIG. 3, and for managing the targeting of MPs during a campaign. During the run time for an active campaign, new data gathered from time to time and MP rankings based on cost per engagement are reevaluated such that results for the active campaign may be dynamically optimized according to exemplary methods described at least as shown per FIG. 4.

Figure 3:
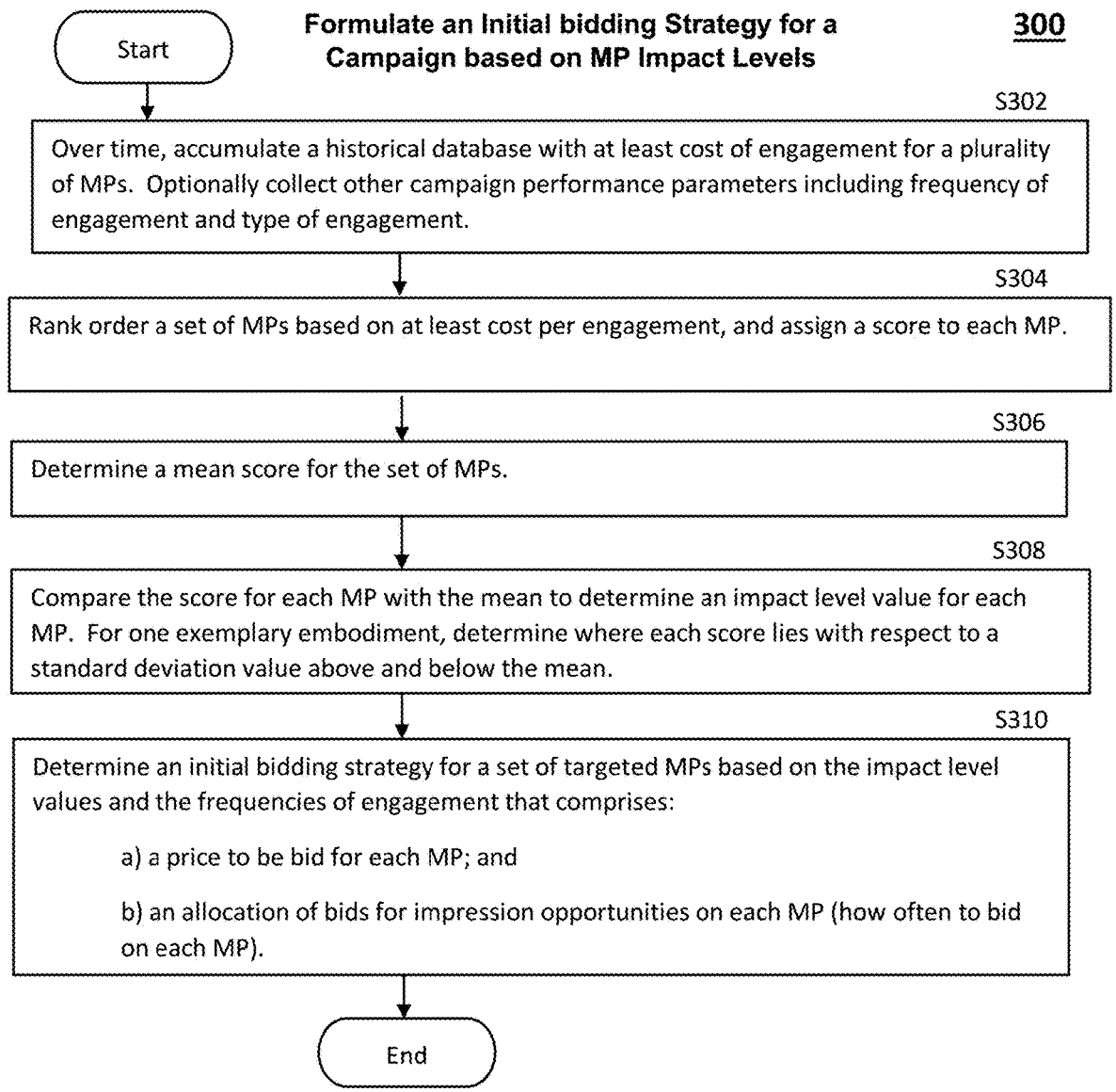
FIG. 3 shows a flowchart with exemplary and non-limiting methods described for evaluation before a campaign to determine an initial strategy for bidding for impression opportunities on one or more targeted MPs.

As shown per exemplary and non-limiting flowchart 300 of FIG. 3, in step S302 a historical database is accumulated for a plurality of online advertising auctions over time including at least cost per engagement and optionally frequency of engagement and type of engagement for a plurality of MPs. Optionally, other campaign performance parameters are collected. Per step S304, the historical database is analyzed and a set of MPs is rank ordered based on at least cost per engagement, and a score is assigned to each MP based on at least cost per engagement. Per step S306 a mean score is determined for the set of MPs, and per step S308 the score for each MP is compared with the mean score to determine an impact level rating for each MP. For at least one exemplary embodiment an impact level is determined according to where each score lies with respect to standard deviation values above and below the mean score. MPs are each rated by comparing their score to the mean, and those with a score more than one standard deviation above the mean are rated as high-impact. MPs whose score is more than one standard deviation below the mean are rated as low impact, and MPs whose score is within one standard deviation of the mean is rated as having a normal impact. Note that other rating methods are possible, and this example is non-limiting.

To formulate an initial bidding strategy per step S310, a set of targeted MPs is determined based on the impact level ratings determined in step S308 and optionally frequencies of engagement and other targeting parameters for different MPs. An exemplary and non-limiting bidding strategy includes at least a price to be bid for ad opportunities on each MP, and an allocation of bids for impression opportunities on each MP wherein a portion of a total campaign budget is allocated to spending for impressions on each MP. The allocation can be reflected in how frequently the demand-side platform should bid for each MP versus bidding for opportunities on other MPs. It may turn out that when the historical database is analyzed, certain MPs have exceptional impact rating values however are low in viewing rate or engagement rate frequency due to impression opportunities becoming available less frequently, or due to a propensity for viewers to not engage on those MPs. As a result, in order to establish a reasonable probability that enough impression opportunities will be available to complete an advertising campaign within an allotted runtime, it may often be necessary to allocate the campaign budget differently by including MPs with lower impact rating values.

For example, if the viewing rate and/or engagement rate is lower for an MP with a higher impact level rating,—compared to an initial allocation, or to an allocation during a campaign up to a specific point in time—a larger number of bids will be made for impression opportunities on other MPs with lower impact level ratings, in order to increase a probability that campaign requirements will be met in a prescribed run time. Also, if the viewing rate and/or engagement rate is higher for an MP with a lower impact level rating, —compared to an initial allocation, or to an allocation during a campaign up to a specific point in time—a smaller number of bids will be made for impression opportunities on that MP, in order to avoid campaign requirements being met prematurely with respect to a prescribed run time.

When analyzing the historical database of at least cost per engagement, it may be preferable to perform an analysis only with respect to advertising campaigns conducted on behalf of one specific client/advertiser. Alternately, it may be desirable to perform the analysis of the historical database with respect to advertising campaigns conducted on behalf of more than one specific client/advertiser, or all client/advertisers, since inclusion of all activity at a demand-side platform provides advantages for all client/advertisers partnering with that specific demand-side platform when competing in auctions with advertisers who operate independently or partner with different demand-side platforms.

Figure 4:
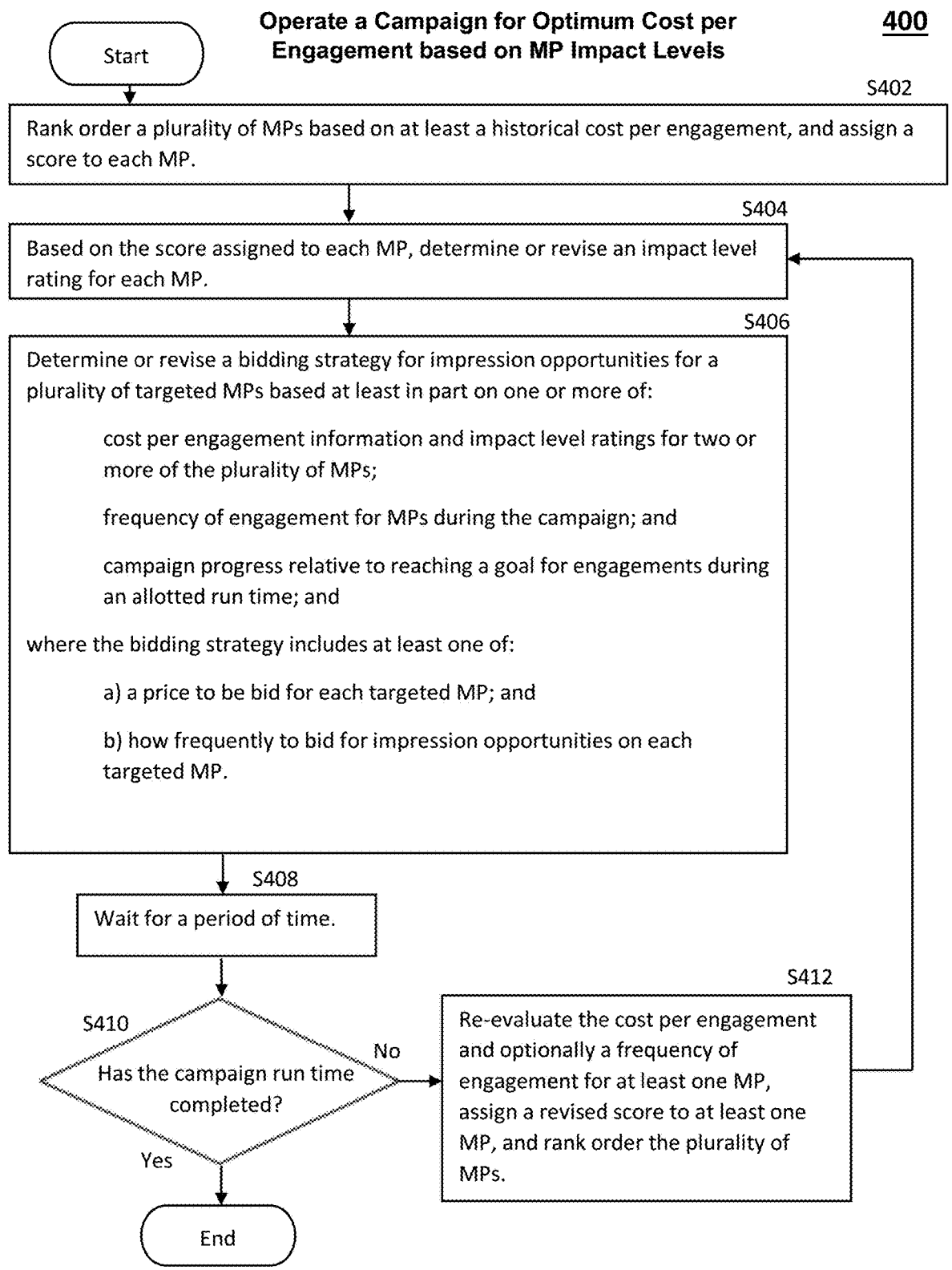
FIG. 4 shows a flowchart with exemplary and non-limiting methods described for dynamic re-evaluation from time to time during a campaign resulting in a revised bidding strategy for bidding for impression opportunities on one or more targeted MPs.

An exemplary flowchart 400 that describes operation of a campaign to achieve optimal cost per engagement based on impact levels including re-evaluation during the course of an active campaign is shown in FIG. 4. First to establish an initial strategy, per step S402 a plurality of MPs is rank ordered based on at least a historical cost per engagement, and scores are assigned to each MP. Then per S404, based on the score assigned to each MP an impact level rating for each MP is determined. Per step S406 a bidding strategy is either initially established or alternately revised during a campaign for impression opportunities for a plurality of MPs-based at least in part on:

cost per engagement information and impact level ratings for two or more of the plurality of MPs;

frequency values for viewing rate and/or engagement rate for MPs during the campaign; and campaign progress relative to reaching a goal for engagements during an allotted run time; and wherein the bidding strategy includes at least one of:

a) a price to be bid for each targeted MP; and b) how frequently to bid for impression opportunities on each targeted MP.

As discussed with respect to FIG. 3, an advertising campaign will favor bidding on MPs with higher impact level ratings, however frequency values will be taken into account. When MPs with higher impact level ratings have low frequency values for viewing rate and/or engagement rate with respect to impression opportunities on those MPs, then MPs with lower impact level ratings will be introduced to ensure campaign completion. Then per step 408, a period of time will pass according to the process of flowchart 400, and subsequently per step S410 it will be determined if the campaign runtime has been completed. If the runtime has completed, the process will end and the campaign will be complete. If the campaign runtime has not completed, then per step S412 the cost per engagement and optionally a frequency of engagement will be reevaluated for at least one MP, and revised scores will be assigned to at least one MP followed by rank ordering the plurality of MPs to determine a revised rank ordering. Then, the process will move to step S404 where revised impact level ratings will be determined for each MP followed by the determination of the revised bidding strategy for the plurality of targeted MPs per step S406.

Favoring an MP with a higher impact level rating comprises bidding for more impression opportunities on that MP and fewer impression opportunities on MPs with lower impact level ratings. In addition to bidding more frequently for MPs with higher impact level ratings, favoring an MP with a higher impact level rating may also comprise bidding higher monetary amounts for impression opportunities on that MP and lower monetary amounts for impression opportunities on MPs with lower impact level ratings.

A revised bidding strategy may comprise for example increasing a frequency of bidding for impression opportunities for an MP whose revised impact level rating has increased relative to an earlier point in time during the campaign run time. Also, a revised bidding strategy may comprise for example increasing a monetary amount bid for impression opportunities for an MP whose revised impact level rating has increased relative to an earlier point in time during the campaign run time.

Re-evaluating at least the cost per engagement for one or more of a plurality of MPs to establish revised impact level ratings may also include updating or replacing information to revise the historical database with respect to at least cost per engagement for at least one of the plurality of MPs, then re-analyzing the revised historical database to establish a revised ranking order. Then scores can be re-assigned for each MP with respect to at least its cost per engagement, a new mean score can be determined for all analyzed MPs, followed by revising impact level ratings by comparing with respect to the revised mean score.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

At least certain principles of the invention can be implemented as hardware, firmware, software or any combination thereof. Moreover, the software is preferably implemented as an application program tangibly embodied on a program storage unit, a non-transitory user machine readable medium, or a non-transitory machine-readable storage medium that can be in a form of a digital circuit, an analog circuit, a magnetic medium, or combination thereof. The application program may be uploaded to, and executed by, a machine comprising any suitable architecture. Preferably, the machine is implemented on a user machine platform having hardware such as one or more central processing units ("CPUs"), a memory, and input/output interfaces. The user machine platform may also include an operating system and microinstruction code. The various processes and functions described herein may be either part of the microinstruction code or part of the application program, or any combination thereof, which may be executed by a CPU, whether or not such user machine or processor is explicitly shown. In addition, various other peripheral units may be connected to the user machine platform such as an additional data storage unit and a printing unit.

What is claimed is:

1. In a digital medium environment of real-time bidding and selection of advertisement opportunities corresponding to viewers simultaneously accessing websites via computing devices, a computerized method for dynamically allocating bids between media properties to determine an efficient bidding strategy for an online advertising campaign, comprising:
   determining a set of media properties to be targeted for an online advertising campaign based on an impact level of each media property, wherein the impact level of a given media property is based on a score for the given media property in comparison to a mean score and a standard deviation value of scores of the set of media properties;
   allocating a number of bids for bidding on advertising impression opportunities to a first media property comprising a higher impact level compared to a second media property;
   executing the online advertising campaign in real-time by placing bids for the first media property based on the allocated number of bids; and
   during real-time execution of the online advertising campaign:
      determining a first engagement rate for the first media property utilizing tracked user interactions corresponding to the first media property;
      determining a second engagement rate for the second media property utilizing tracked user interactions corresponding to the second media property; and
      upon determining that the second engagement rate is higher than the first engagement rate:
         allocating a portion of the allocated number of bids from the first media property to the second media property; and
         dynamically switching media properties by placing bids for the second media property based on the portion of the allocated number of bids from the first media property to the second media property.

2. The computerized method of claim 1, further comprising:
   accumulating over a plurality of online advertising auctions a historical database including at least a cost per engagement for each of a plurality of media properties;
   assigning a score for each media property with respect to at least its historical cost per engagement;
   and
   rating each media property to determine an impact level by comparing the score for each media property with respect to the mean score and the standard deviation value.

3. The computerized method of claim 2, further comprising determining an impact level for a media property based on a position of a media property score from the mean score in terms of the standard deviation value.

4. The computerized method of claim 2, wherein accumulating over the plurality of online advertising auctions the historical database including at least the cost per engagement for each of the plurality of media properties comprises accumulating the historical database only for advertising campaigns of an advertiser associated with the online advertising campaign.

5. The computerized method of claim 1, wherein determining the first engagement rate for the first media property comprises determining how frequently an engagement event occurs on the first media property.

6. The computerized method of claim 1, further comprising allocating the portion of the allocated number of bids from the first media property to the second media property in order to increase a probability of reaching a threshold number of engagements during a prescribed run time of the online advertising campaign.

7. The computerized method of claim 1, further comprising allocating a subset of the portion of the allocated number of bids from shifted from the first media property to the second media property back to the first media property in order to avoid reaching a threshold number of engagements during a prescribed run time of the online advertising campaign prematurely with respect to the prescribed run time.

8. A system for dynamically allocating bids between media properties to determine an efficient bidding strategy for an online advertising campaign in a digital medium environment of real-time bidding and selection of advertisement opportunities corresponding to viewers simultaneously accessing websites via computing devices, the system comprising:
at least one processor; and
at least one non-transitory computer-readable storage medium storing instructions thereon that, when executed by the at least one processor, cause the system to:
determine a set of media properties to be targeted for an online advertising campaign based on an impact level of each media property, wherein the impact level of a given media property is based on a score for the given media property in comparison to a mean score and a standard deviation value of scores of the set of media properties;
allocate a number of bids for bidding on advertising impression opportunities to a first media property comprising a higher impact level compared to a second media property;
execute the online advertising campaign in real-time by placing bids for the first media property based on the allocated number of bids; and
during real-time execution of the online advertising campaign:
determine a first engagement rate for the first media property utilizing tracked user interactions corresponding to the first media property;
determine a second engagement rate for the second media property utilizing tracked user interactions corresponding to the second media property;
upon determining that the second engagement rate is higher than the first engagement rate:
allocate a portion of the allocated number of bids from the first media property to the second media property; and
dynamically switch media properties by placing bids for the second media property based on the portion of the allocated number of bids from the first media property to the second media property.

9. The system of claim 8, further comprising instructions that, when executed by the at least one processor, cause the system to:
accumulate over a plurality of online advertising auctions a historical database including at least a cost per engagement for each of a plurality of media properties;
assign a score for each media property with respect to at least its historical cost per engagement;
and
rate each media property to determine an impact level by comparing the score for each media property with respect to the mean score.

10. The system of claim 9, further comprising instructions that, when executed by the at least one processor, cause the system to rate each media property to determine the impact level by comparing the score for each media property with respect to the mean score by:
rating each media property to determine the impact level by comparing the score for each media property with the mean score and the standard deviation value.

11. The system of claim 10, further comprising instructions that, when executed by the at least one processor, cause the system to rate a media property with a score more than one standard deviation value above the mean score with a higher impact level.

12. The system of claim 10, further comprising instructions that, when executed by the at least one processor, cause the system to rate a media property with a score within one standard deviation value of the mean score with a normal impact level.

13. The system of claim 10, further comprising instructions that, when executed by the at least one processor, cause the system to rate a media property with a score more than one standard deviation value below the mean score with a lower impact level.

14. A non-transitory computer readable medium for dynamically allocating bids between media properties to determine an efficient bidding strategy for an online advertising campaign in a digital medium environment of real-time bidding and selection of advertisement opportunities corresponding to viewers simultaneously accessing websites via computing devices, the non-transitory computer readable medium storing instructions thereon that, when executed by at least one processor, cause a computing device to:
determine an initial strategy for bidding for impression opportunities on a plurality of targeted media properties based at least in part on a historical database that includes at least cost per engagement information and impact level ratings based on previous online advertising campaigns, wherein an impact level rating of a given media property is based on a score for the given media property in comparison to a mean score and a standard deviation value of scores of the plurality of targeted media properties;
during a real-time execution of the online advertising campaign, re-evaluating at least the cost per engagement for one or more of the plurality of targeted media properties utilizing tracked user interactions corresponding to the plurality of targeted media properties, and establishing revised impact level ratings in the historical database for the one or more of the plurality of targeted media properties; and
revising the bidding strategy based on the revised impact level ratings;
wherein the bidding strategy for impression opportunities received during the online advertising campaign favors bidding on media properties with higher impact level ratings; and
wherein the bidding strategy includes at least one of:
a price to bid for each targeted media property; and how frequently to bid for each targeted media property when impression opportunities are received for that targeted media property.

15. The non-transitory computer readable medium of claim 14, wherein the instructions that, when executed by the at least one processor, cause the computing device to revise the bidding strategy by increasing a frequency of bidding for impression opportunities for a targeted media property whose revised impact level rating has increased relative to an earlier point in time during the campaign run time.

16. The non-transitory computer readable medium of claim 14, wherein the instructions that, when executed by the at least one processor, cause the computing device to revise the bidding strategy by increasing a monetary amount bid for impression opportunities for a targeted media property whose revised impact level rating has increased relative to an earlier point in time during the campaign run time.

17. The non-transitory computer readable medium of claim 14, further comprising instructions that, when executed by the at least one processor, cause the computing device to determine a bid allocation among the targeted media properties for bidding on advertising impression opportunities based at least one on an engagement rate for each of the targeted media properties.

18. The non-transitory computer readable medium of claim 17, further comprising instructions that, when executed by the at least one processor, cause the computing device to increase a frequency of bidding for impression opportunities on media properties with lower impact level ratings compared to a media property with a higher impact rating but a lower engagement rate, in order to increase a probability that campaign requirements will be met in a prescribed run time.

19. The non-transitory computer readable medium of claim 17, further comprising instructions that, when executed by the at least one processor, cause the computing device to reduce a frequency of bidding for impression opportunities on a media property a high engagement rate, in order to avoid campaign requirements being met prematurely with respect to a prescribed run time.

20. The system of claim 8, further comprising instructions that, when executed by the at least one processor, cause the system to allocate the portion of the allocated number of bids from the first media property to the second media property in order to increase a probability of reaching a threshold number of engagements during a prescribed run time of the online advertising campaign.

* * * * *